United States Patent
Yamasaki (10) Patent No.: US 8,736,745 B2
(45) Date of Patent: May 27, 2014

(54) CAMERA

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 13/516,794

(22) PCT Filed: Nov. 25, 2010

(86) PCT No.: PCT/JP2010/006872
§ 371 (c)(1),
(2), (4) Date: Jun. 18, 2012

(87) PCT Pub. No.: WO2011/077639
PCT Pub. Date: Jun. 30, 2011

(65) Prior Publication Data
US 2012/0274837 A1    Nov. 1, 2012

(30) Foreign Application Priority Data

Dec. 22, 2009    (JP) .................................. 2009-290246

(51) Int. Cl.
*G03B 13/00*        (2006.01)
*H04N 5/232*        (2006.01)

(52) U.S. Cl.
USPC ............ 348/353; 348/345; 348/350; 348/360

(58) Field of Classification Search
CPC ... H04N 5/2312; H04N 5/2351; H04N 5/235; H04N 5/57; H04N 5/2393; G03B 7/36; G03B 13/36
USPC ................................................. 348/345–361
See application file for complete search history.

(56) References Cited

U.S. PATENT DOCUMENTS

| | | | |
|---|---|---|---|
| 6,453,124 B2 | 9/2002 | Morimoto et al. | |
| 6,954,233 B1 * | 10/2005 | Ito | 348/350 |
| 7,058,294 B2 * | 6/2006 | Nakahara | 396/104 |
| 7,873,267 B2 * | 1/2011 | Kusaka | 396/104 |
| 8,077,255 B2 * | 12/2011 | Shintani et al. | 348/360 |
| 2005/0162541 A1 * | 7/2005 | Ito | 348/345 |
| 2005/0285967 A1 * | 12/2005 | Suda | 348/345 |
| 2007/0102619 A1 * | 5/2007 | Kusaka | 250/201.2 |

(Continued)

FOREIGN PATENT DOCUMENTS

| | | |
|---|---|---|
| CN | 100339759 C | 9/2007 |
| CN | 100474025 C | 4/2009 |

(Continued)

OTHER PUBLICATIONS

Chinese Office Action issued in corresponding application No. 201080059329.5 mailed Dec. 25, 2013.

*Primary Examiner* — Timothy J Henn
*Assistant Examiner* — Pritham Prabhakher
(74) *Attorney, Agent, or Firm* — Carter, DeLuca, Farrell & Schmidt LLP (57) ABSTRACT

A camera to which a lens unit is exchangeably attached includes a phase difference detection type focus detection unit, a contrast detection type focus detection unit, and a processor configured to acquire correction information used to correct a shift amount between a focus detecting light flux and an image-pickup light flux from the image pickup lens. The contrast detection type focus detection unit performs scanning in a single direction from a focus position detected by the phase difference detection type focus detection unit, the single direction being set based on the correction information.

5 Claims, 7 Drawing Sheets

(56) References Cited

U.S. PATENT DOCUMENTS

| | | | |
|---|---|---|---|
| 2009/0115882 A1* | 5/2009 | Kawarada | 348/340 |
| 2010/0194967 A1* | 8/2010 | Amano | 348/345 |
| 2011/0001858 A1* | 1/2011 | Shintani et al. | 348/294 |
| 2011/0102653 A1* | 5/2011 | Shintani et al. | 348/294 |

FOREIGN PATENT DOCUMENTS

| | | |
|---|---|---|
| CN | 101472071 A | 7/2009 |
| JP | 63-172110 A | 7/1988 |
| JP | 10-026725 A | 1/1998 |
| JP | 2000-156823 A | 6/2000 |
| JP | 2001-281530 A | 10/2001 |
| JP | 2004-219581 A | 8/2004 |
| JP | 2004-309866 A | 11/2004 |
| JP | 2007-323063 A | 12/2007 |
| JP | 2009-003122 A | 1/2009 |
| JP | 2009-139728 A | 6/2009 |

* cited by examiner

CAMERA

TECHNICAL FIELD

The present invention relates to a camera (image pickup apparatus).

BACKGROUND ART

Patent Literature 1 discloses a hybrid focus detection unit that includes a focus detection unit of a phase difference detection method (simply referred to as a "phase difference AF" hereinafter), and a focus detection unit of a contrast detection method (simply referred to as a "TVAF" hereinafter). Patent Literature 2 discloses a phase difference detection (image pickup surface phase difference AF (simply referred to as a "SAF" hereinafter) function by providing an image pickup device with an imaging pixel and a focus detecting pixel, and a pupil splitting unit. Patent Literature 3 discloses a phase difference AF using a secondary imaging optical system.

Other prior art include Patent Literatures 4 and 5.

CITATION LIST

Patent Literature

[PTL 1] Japanese Patent Laid-Open No. 2004-219581095047
[PTL 2] Japanese Patent Laid-Open No. 2009-003122
[PTL 3] Japanese Patent Laid-Open No. 2007-323063
[PTL 4] Japanese Patent Laid-Open No. 63-172110
[PTL 5] Japanese Patent Laid-Open No. 2000-156823

SUMMARY OF INVENTION

Technical Problem

Since the TVAF has an excellent focus detection precision but requires a long time for focusing, the TVAF cannot be applied when an allowable time period required for the focus detection is short, in particular, in following a moving body or at the consecutive shooting time.

The present invention provides a camera configured to provide a quick and precise focus detection.

Solution to Problem

A camera according to the present invention is a camera to which a lens unit is exchangeably attached. The lens unit includes an image pickup lens configured to form an object image, and is compatible with a first focus detection unit configured to provide a focus detection by detecting a phase difference between a pair of object images formed by utilizing a first pupil splitting unit. The camera includes a second focus detection unit configured to provide a focus detection by detecting a phase difference between a pair of object images formed by utilizing a second pupil splitting unit different from the first pupil splitting unit, a third focus detection unit configured to provide a focus detection by detecting a peak position of a contrast of the object image by performing scanning that changes a distance between an image pickup device and a focus position formed by the image pickup lens, and an acquisition unit configured to acquire correction information used to correct a shift amount between a focus detecting light flux and an image-pickup light flux from the image pickup lens. The third focus detection unit performs the scanning in a single direction from a focus position detected by the second focus detection unit, the single direction being set based on the correction information.

Further features of the present invention will become apparent from the following description of exemplary embodiments with reference to the attached drawings.

Advantageous Effect of Invention

The present invention can provide a camera configured to provide a quick and precise focus detection.

DESCRIPTION OF EMBODIMENTS

Figure 1:
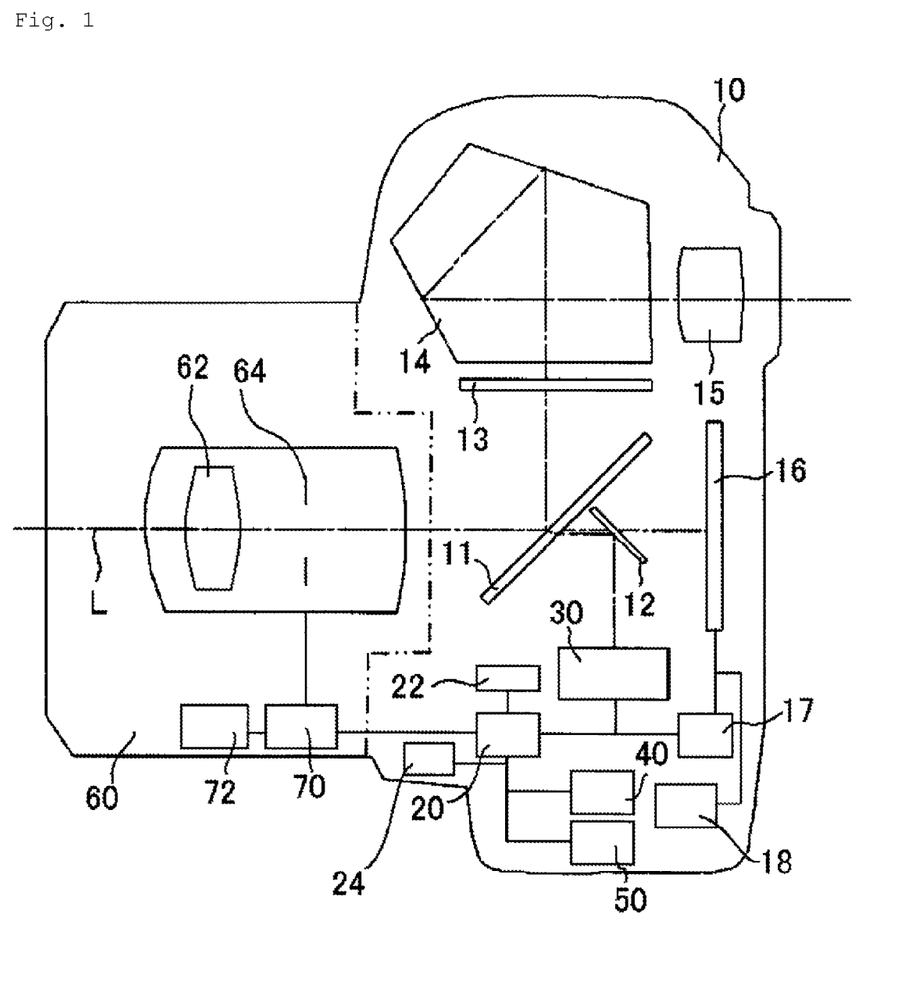
FIG. 1 is a block diagram of a digital camera (image pickup apparatus) to which this embodiment is applicable.

FIG. 1 is a block diagram of a principal portion relating to an autofocus of a digital camera of this embodiment. The digital camera of this embodiment is a lens exchange type of a single-lens reflex camera, and includes a camera body 10 and a lens unit 60.

The lens unit 60 is exchangeably attached to the camera body 10, and includes an image pickup lens 62, a stop 64, a lens MPU 70, and a lens memory 72.

The image pickup lens 62 is configured to form an object image and includes a focus lens (not illustrated) configured to move back and forth in the optical axis direction for focusing, and a zoom lens (not illustrated) configured to provide zooming. L denotes an optical axis of an image pickup lens 62.

The stop 64 serves to adjust its opening diameter so as to adjust a light quantity at the image pickup time, and serves as a shutter used to adjust an exposure speed.

The lens MPU 70 provides all operations and controls relating to the image pickup lens, and controls driving of the focus lens and the zoom lens of the image pickup lens 62, and driving of the stop 64. In addition, the lens MPU 70 detects a current lens position, and informs the lens position information to the camera MPU 20 in response to a request from the camera MPU 20.

The lens memory (first memory) 72 stores optical information (correction information) necessary for autofocus containing a focus detection correction value (correction information) BP and a shift direction, as described later. As described later, the first memory configured to store the correction information may be provided to either the camera body 10 or the lens unit 60.

The camera body 10 includes, a primary mirror 11, a secondary mirror 12, a focusing screen 13, a pentaprism 14, an eyepiece 15, an image pickup device 16, an image pickup device driving circuit 17, an image processing circuit 18, a camera MPU 20, a memory 22, operation switches 24, a phase difference AF unit (first focus detection unit) 30, an SAF unit (second focus detection unit) 40, and a TVAF (third focus detection unit) 50.

The phase difference AF unit 30 is not indispensable to the camera body 10. For example, assume that the lens unit 60 is compatible with a phase difference AF unit and can be exchangeably attached to a camera that includes the phase difference AF unit as a sole focus detection unit, and that the lens memory 72 stores a focus detection correction value BP. This embodiment is viable even when such a lens unit 60 is exchangeably attached to a camera body having no phase difference AF unit among the above components.

Arranged between the image pickup lens 62 and the image pickup device 16 are the primary mirror 11 and the secondary mirror 12 configured to enter an optical path from the image pickup lens 62 to the image pickup device 16 at an observation time using the optical viewfinder and to retreat from the optical path at the image pickup time. The primary mirror 11 is made of a half-mirror, and splits the light flux from the image pickup lens 62 into reflection light flux towards the optical viewfinder system and transmission light towards the secondary mirror 12. The reflection light forms an image on a mat surface on the focusing screen 13, which is in turn is observed by an operator via the pentaprism 14 and the eyepiece lens 15. On the other hand, the light that has transmitted the primary mirror 11 is reflected by the secondary mirror 12, and led to the phase difference AF unit 30.

The image pickup device 16 includes a C-MOS sensor and its peripheral circuit, in which one photoelectric conversion element is arranged on a light reception pixel of m pixels in the lateral direction and n pixels in the longitudinal direction. The image pickup device 16 is configured to photoelectrically convert an object image. The image pickup device 16 is configured so that all pixels can be independently output. In addition, some of the pixels serve as a focus detecting pixel, which can provide an SAF on an image pickup surface (second image surface).

More specifically, the image pickup device 16 includes a plurality of image pickup pixels configured to receive the light that passes all areas of the exit pupil of the image pickup lens configured to form an object image and to photoelectrically convert an object image, a plurality of focus detecting pixels, and a pupil splitting unit (second pupil splitting unit) configured to guide a light flux that passes a different region of the exit pupil of the image pickup lens 62, to each focus detecting pixel.

A plurality of focus detecting pixels as a whole can receive light fluxes that pass all regions of the exit pupil of the image pickup lens. For example, the image pickup device 16 is made by replacing the R pixel and the B pixel in the two columns× two rows pixels with the focus detecting pixels while a pair of diagonally arranged G pixels is maintained. The pupil splitting unit includes a wiring layer having a micro lens and an opening disclosed in FIGS. 6 and 7 in Patent Literature 2.

The image pickup device driving circuit 17 controls an operation of the image pickup device 16, performs an analogue-to-digital conversion to the obtained image signal, and sends the resultant signal to the camera MPU 20. The image processing circuit 18 performs a Y conversion, a color interpolation, and a JPEG compression to an image obtained by the image pickup device 16.

The camera MPU (controller) 20 is a processor configured to provide all operations and controls relating to the camera body 10. The camera MPU 20 is connected to the lens MPU 70, and requests the lens MPU 70 for information of a position of the image pickup lens 62, driving of a lens by a predetermined driving amount, and optical information, such as a focal length, peculiar to the lens unit 60.

The camera MPU 20 also serves as an acquisition unit configured to acquire correction information which will be described later. In this embodiment, the camera MPU 20 obtains correction information from the lens memory 72 of the lens unit 60. However, the camera body 10 can be connected to a computer or a cellular phone (electronic apparatus) by a connection unit, such as a USB cable, and correction information may be obtained via the Internet (or another network) and the electronic apparatuses.

The camera MPU 20 provides an AF control used to drive the focus lens via the lens MPU 70 based on a detection result of each focus detection unit. In addition, the camera MPU 20 makes the TVAF unit 50 perform a focus detection after the SAF unit 40 performs a focus detection.

In this embodiment, the camera MPU 20 sets a scanning direction for the TVAF unit 50 to a predetermined direction based on the correction information from a focus position detected by the SAF unit 40. However, this embodiment does not require the controller to set the scanning direction for the TVAF unit 50. In other words, it is sufficient that the TVAF unit 50 can scan from the focus position detected by the SAF unit 40 in a single direction which is set based on the correction information.

Figure 5:
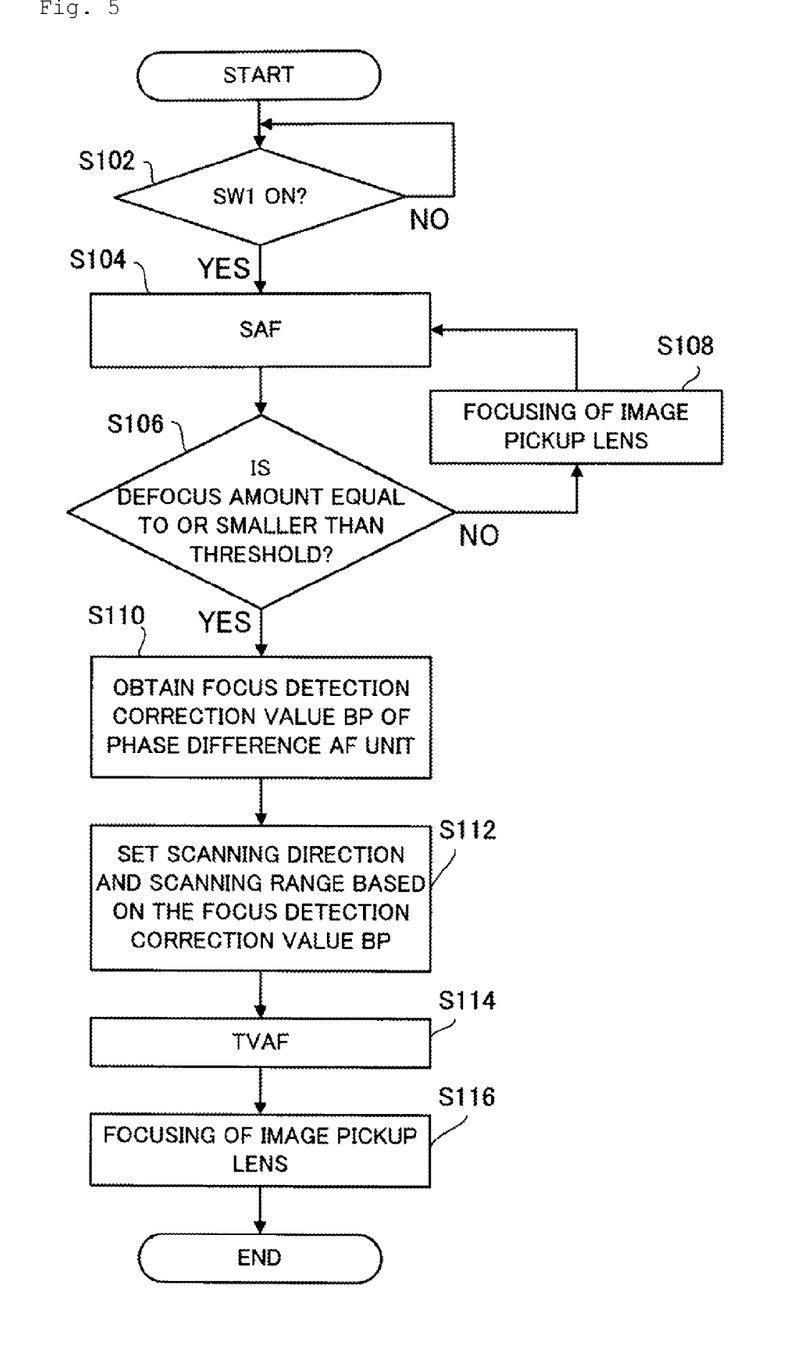
FIG. 5 is a flowchart for explaining an autofocus operation performed by a camera MPU illustrated in FIG. 1.
Figure 7:
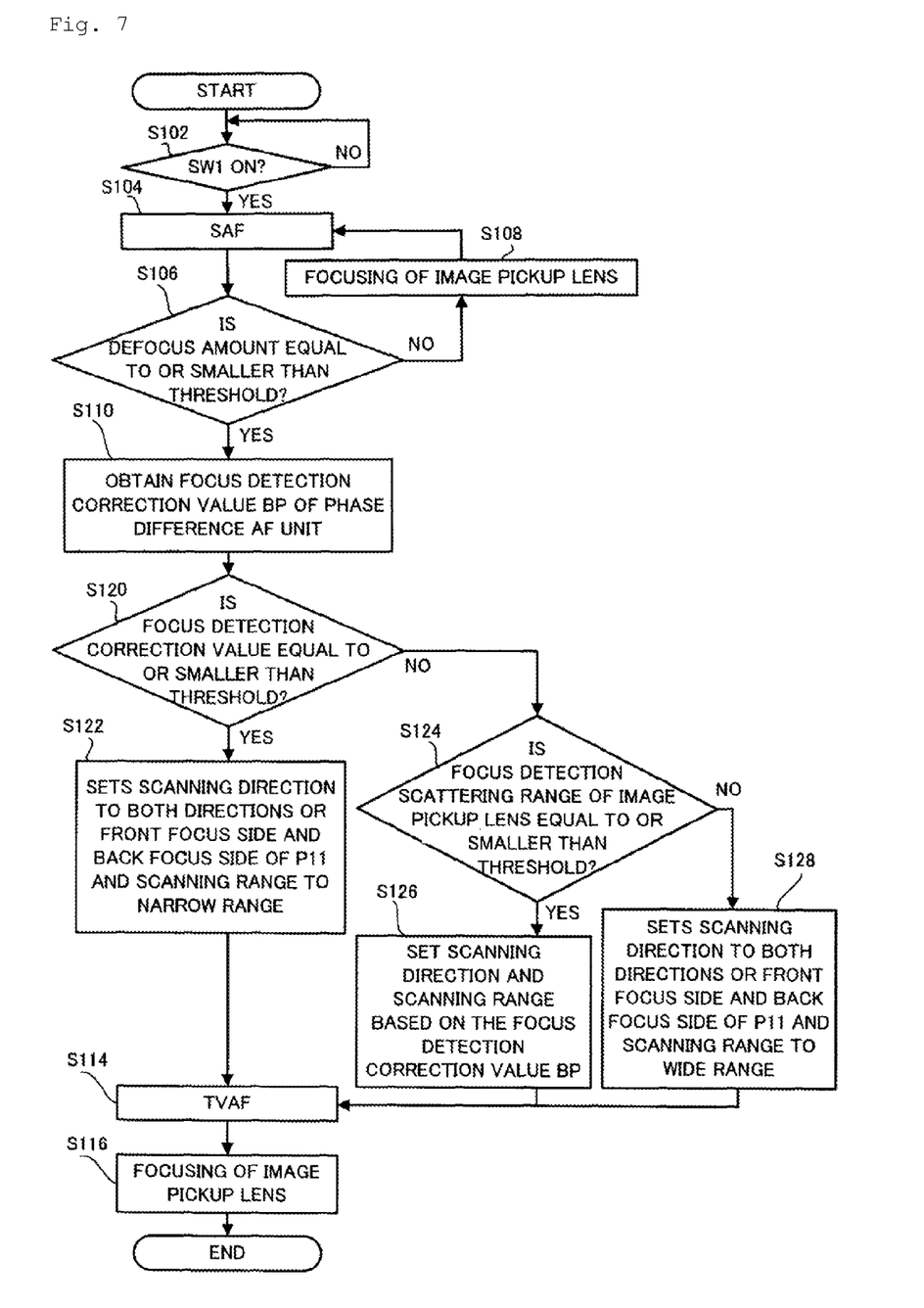
FIG. 7 is a flowchart as a variation of FIG. 5.

The memory (second memory) 22 stores a program used to control the camera operations, and a variety of thresholds, such as a threshold used for S106 in FIG. 5, a threshold used for S106, a threshold (first threshold) used for S120 and a threshold (second threshold) used for S124 in FIG. 7.

In addition, as described above, the memory 22 may serve as the first memory configured to store a focus detection correction value BP used to correct a shift amount.

The operational switches (simply referred to as an "operational SW" hereinafter) 24 include a power switch, release (image pickup trigger) switches (SW1, SW2), a zooming switch, an image pickup mode selection switch, a dial, and another input part. The operational SW 24 serves as a setting unit configured to set a focus detection region which is an object of an actual focus detection in a plurality of focus detection regions displayed on the viewfinder.

The phase difference AF unit (phase difference focus detection unit) 30 includes a first pupil splitting unit configured to guide a light flux that has passed a different pupil area of the image pickup lens 62, and serves as a first focus detection unit configured to detect a focus of the image pickup lens 62 by detecting a phase difference between image signals of a pair of object images on an image plane (first image plane).

The phase difference AF unit 30 of this embodiment performs a phase difference AF using a secondary imaging optical system disclosed in Patent Literature 3, and a field mask, a field lens, a stop, a secondary imaging lens unit, a light receiving element arranged on a first image plane. However, as long as a phase difference between a pair of object images can be detected, its structure is not limited to that of Patent Literature 3.

Figure 2:
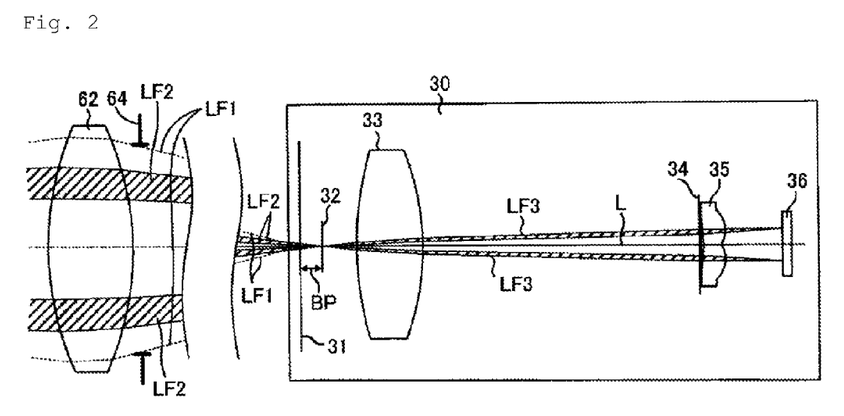
FIG. 2 is an optical path diagram from an image pickup lens to a phase difference AF unit in a digital camera illustrated in FIG. 1.

FIG. 2 is a partial optical diagram of an optical system between the image pickup lens 62 and the phase difference AF unit 30. An optical operation similar to FIG. 2 is applied to a direction orthogonal to the paper plane of FIG. 2. Light fluxes LF1 illustrated by dotted lines are image-pickup light fluxes that pass an image pickup lens 62 and a stop 64, and form an image at the center of the light receiving surface of the image pickup device 16 or at an intersection between the field mask 31 and an optical axis L of the image pickup lens 62. Light fluxes LF2 illustrated by bevel lines are focus detecting light fluxes.

As described above, the phase difference AF of this embodiment includes a field mask 31, a field lens 33, a stop 34, and a secondary imaging lens unit 35, and a light receiving element 36 along an optical axis L in order from the image pickup lens 62. The field mask 31 is arranged at a position optically equivalent to the light receiving surface of the image pickup device 16.

The field lens 33 has a representative exit pupil position by a plurality of types of image pickup lenses 62 and an optical power configured to form an image of the stop 34. When it is assumed that the stop 64 is located at the exit pupil position of the image pickup lens 62, a pair of openings of the stop 34 is projected onto a plane of the stop 64 by the field lens 33. Focus detecting light fluxes LF3 illustrated by bevel lines are turned on two split light fluxes on the stop 64, and the light receiving element 36 receives the pair of pupil-split focus detecting light fluxes LF3 of the image pickup lens 62. Thus, the field lens 33 and the stop 34 serve as the above first pupil splitting unit.

The image-pickup light fluxes LF1 form an image on the field mask 31. The pair of focus detecting light fluxes LF2 do not form an image on the field mask 31 but form an image on the subsequent plane 32. When the imaging positions of the image-pickup light fluxes LF1 and the focus detecting light fluxes LF2 are thus different, the best image-plane position shifts and the focus detection correction value BP is necessary to correct this shift.

The focus detection correction value BP is correction information used to correct a shift amount of an image-plane position in the optical axis direction between the image-pickup light flux LF1 and the focus detecting light flux LF2 from the image pickup lens 62, each of which enters the phase difference AF unit 30. As described above, the first memory stores the focus detection correction value BP, and the focus detection correction value BP contains information on a shift direction. The "shift direction" indicates whether an image-plane position of the focus detecting light flux LF2 is located on a front focus side or a back focus side of the image-plane position of the image-pickup light flux LF1.

FIG. 2 illustrates a state when the focus detection correction value BP has been correctly reflected after the phase AF unit 30 detects a focus. FIG. 2 illustrates that the image-plane position (plane 32) of the focus detecting light flux LF2 is located on the back focus side of the image-plane position (field mask 31) of the image-pickup light flux LF1.

The focus detection correction value BP may be stored in the lens memory 72 for each opening (not illustrated) of the field mask 31. The best image-plane position is shifted by a difference of the light flux, by a difference of a received spectral characteristic between the image pickup device 16 and that of the light receiving element 36, or by a difference of a spatial frequency to be addressed, and the focus detection correction value BP of this embodiment contains these pieces of information.

Table 1 illustrates one example of the focus detection correction value BP stored in the lens memory 72 or the memory 22.

TABLE 1

|  |  | Zoom Position | | | | | | | |
|---|---|---|---|---|---|---|---|---|---|
|  |  | 1 | 2 | 3 | 4 | 5 | 6 | 7 | 8 |
| Focus | 1 | BP111 | BP112 | BP113 | BP114 | BP115 | BP116 | BP117 | BP118 |
| Position | 2 | BP121 | BP122 | BP123 | BP124 | BP125 | BP126 | BP127 | BP128 |
|  | 3 | BP131 | BP132 | BP133 | BP134 | BP135 | BP136 | BP137 | BP138 |
|  | 4 | BP141 | BP142 | BP143 | BP144 | BP145 | BP146 | BP147 | BP148 |
|  | 5 | BP151 | BP152 | BP153 | BP154 | BP155 | BP156 | BP157 | BP158 |
|  | 6 | BP161 | BP162 | BP163 | BP164 | BP165 | BP166 | BP167 | BP168 |
|  | 7 | BP171 | BP172 | BP173 | BP174 | BP175 | BP176 | BP177 | BP178 |
|  | 8 | BP181 | BP182 | BP183 | BP184 | BP185 | BP186 | BP187 | BP188 |

In Table 1, this embodiment divides the zoom position and the focus position of the image pickup lens 62 into eight, and sets the focus detection correction values BP 111 to BP 188 to each position for a highly precise correction.

The SAF unit 40 of this embodiment is a second focus detection unit configured to provide a phase difference AF utilizing an image signal of a focus detecting pixel embedded in the image pickup device 16. More specifically, the SAF unit 40 provides an SAF that detects a focus state of the image pickup lens 62 by detecting a phase difference of a pair of object image formed by the focus detecting pixels and the light flux that passes a pair of pupil regions of the image pickup lenses 62. A principle of the SAF is similar to that described with respect to FIGS. 5-7 of Patent Literature 2, and the SAF unit 40 includes a synthesizing unit, a coupling unit, and an operating unit disclosed in FIG. 8 of Patent Literature 2.

However, the second focus detection unit is not limited to the SAF unit, and it is sufficient that the SAF unit includes a second pupil splitting unit different from the first pupil splitting unit and detects a first focus position of the image pickup lens 62 by detecting a phase difference between a pair of object images on a second image plane different from the first image plane.

The TVAF unit (contrast focus detection unit) 50 is a third focus detection unit configured to detect a focus in a contrast detection method utilizing a contrast component included in image information obtained by the image processing circuit 18. The TVAF detects a position of the focus lens corresponding to a peak of the contrast by moving the focus lens utilizing a focus detection frame that defines an area as an object of a focus detection and a so-called mountain climbing method.

However, the third focus detecting unit is not necessarily limited to that configured to move the focus lens. It is sufficient that the third focus detection unit performs scanning that changes a distance between the focus position formed by the image pickup lens 62 and the image pickup device 16, and detects as a second focus position a peak position of the contrast of the object image formed by the image pickup device 16.

This embodiment utilizes a hybrid focus detection unit that combines the SAF with the TVAF. This embodiment moves the focus lens 104 to a position near an on-focus position at a high speed utilizing the SAF and then positions the focus lens 104 to the on-focus position precisely utilizing the TVAF, thereby compromising the responsiveness and the focus detection precision.

Since the TVAF has an excellent focus detection precision but requires a long focusing time period, the TVAF cannot be applied when the allowable time period necessary for the focus detection is short, in particular, in following a moving body and at the consecutive shooting time. Accordingly, this embodiment sets a scanning direction for the TVAF based on information of the focus detection correction value BP after the SAF, and executes the TVAF in that direction. Since the scanning direction is limited, the TVAF time period becomes shortened.

When the focus detection correction value BP is equal to or smaller than a threshold (first threshold) or when the precision of the SAF is low (when a scattering region of the SAF focus detection exceeds a threshold range), the TVAF may be performed from the current position of the focus lens.

Figure 3:
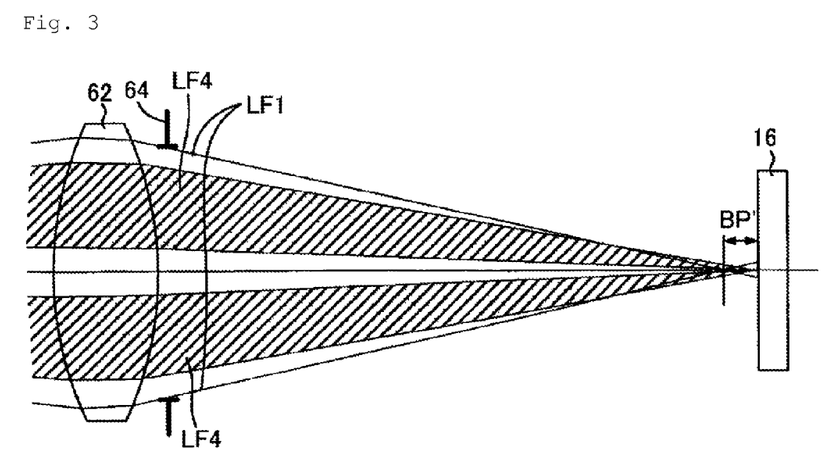
FIG. 3 is an optical path diagram of the image pickup lens and an image pickup device illustrated in FIG. 1 viewed from an optical viewfinder side.

FIG. 3 is an optical path diagram when the image pickup lens 62 and the image pickup device 16 are viewed from the optical viewfinder side. FIG. 3 illustrates the image-pickup light fluxes LF1 that form an image at the center of the image pickup device 16, and focus detecting light fluxes LF4 illustrated by the bevel lines which form an image near the center of the light receiving surface of the image pickup device 16 among the focus detecting light fluxes received by the focus detecting pixel of the image pickup device 16.

For the SAF unit 40, the best image-plane position of the focus detecting light flux LF4 shifts from the best image-plane position of the image-pickup light flux LF1. FIG. 3 illustrates that the image-pickup light flux LF1 forms an image on the image pickup device 16 and the focus detecting light flux LF4 shifts towards the back focus side of the image pickup lens 62 by a distance BP' in the optical axis direction. This is the focus detection correction value BP' of the SAF unit 40.

Near the center portion of the screen, the focus detection correction value BP' is principally caused by the spherical aberration of the image pickup lens 62. When FIG. 2 is compared with FIG. 3, the values of BP and BP' are different but shift toward the back focus side with respect to the image-pickup light flux LF1. This embodiment provides the TVAF utilizing this characteristic.

Figure 4:
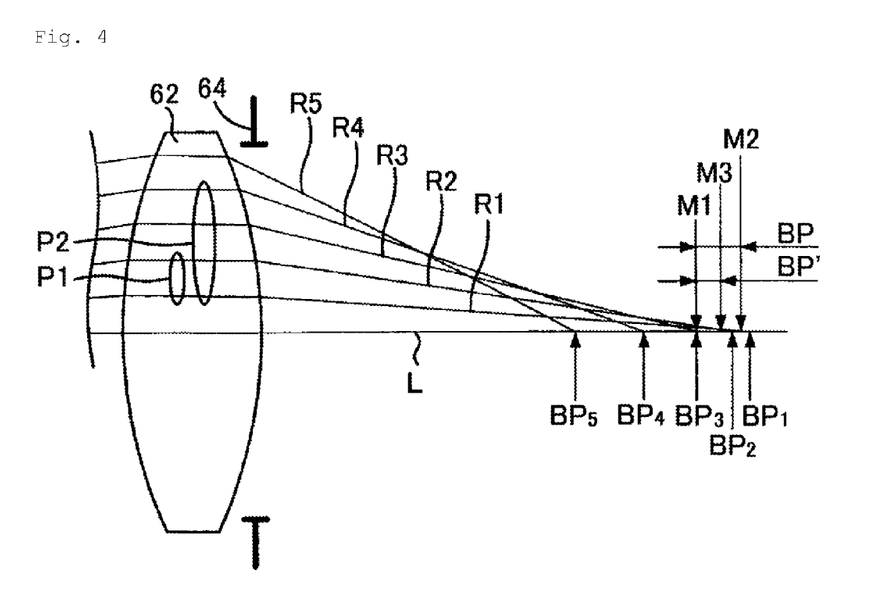
FIG. 4 is an optical path diagram for explaining a relationship between a focus detection correction value of the phase difference AF unit and a focus detection unit of an SAF unit illustrated in FIG. 1.

FIG. 4 is an optical path diagram for explaining a relationship between the focus detection correction values BP and BP'. FIG. 4 is a view illustrating rays that pass on the upper side of the optical axis L and the stop 64 has a release F number. The aberration of the image pickup lens 62 occurs axially symmetrically, and similarly occurs around the optical axis. R1 to R5 denote light fluxes emitted from one object point (not illustrated) on the optical axis L on the object side, and their imaging positions shift due to the spherical aberration of the image pickup lens 62. The ray R1 forms an image at a position BP', the ray R2 forms an image at a position $BP_2$, the ray R3 forms an image at a position $BP_3$, the ray R4 forms an image at a position $BP_4$, and the ray R5 forms an image at a position $BP_5$.

Assume that the best image-plane position of the image-pickup light flux LF1 is an average position of the imaging positions $BP_1$ to the imaging position $BP_5$. Then, the best image-plane position becomes the best image-plane position M1 that is the same as the position $BP_3$.

On the other hand, the best image-plane position of the phase difference AF unit 30 is determined by light fluxes that pass the pupil P1, which contains the rays R1 and R2. Therefore, the best image-plane position becomes the position M2 between $BP_1$ and $BP_2$. As a result, the focus detection correction value BP of the phase difference AF unit 30 is obtained as illustrated in FIG. 4.

In addition, the best image-plane position by the SAF unit 40 is determined by light fluxes that pass the pupil P2, which contains the rays R1 to R4. Therefore, the best image-plane position is located at a position M3 between $BP_2$ and $BP_3$. As a result, the focus detection correction value BP' of the SAF unit 40 is obtained as illustrated in FIG. 4.

In a simple model in which a spherical aberration of the image pickup lens 62 is addressed, the best image-plane position of the SAF unit 40 shifts in the same direction as the best image-plane position of the phase difference AF unit 30 with respect to the best image-plane position M1 of the image-pickup light flux LF1, and the shift amount is smaller than that of the phase difference AF unit 30. This is because the focus detecting light flux on the exit pupil of the image pickup lens 62 for the SAF unit 40 is thicker than that for the phase difference AF unit 30 and is closer to the image-pickup light flux LF1. Thus, the following equations are established:

$$\frac{BP'}{|BP'|} = \frac{BP}{|BP|} \qquad \text{[Math. 1]}$$

$$|BP'| \leq |BP| \qquad \text{[Math. 2]}$$

Math. 1 indicates that the best image-plane positions of the phase difference AF unit 30 and the SAF unit 40 shift in the same direction from the best image-plane position M1 of the image-pickup light flux LF1. Math. 2 indicates that a shift of the best image-plane position of the SAF unit 40 from the best image-plane position M1 of the image-pickup light flux LF1 is larger than that of the phase difference AF unit 30. Although the image pickup lens 62 actually has a variety of aberrations, the above relationship is established when the focus detection correction value BP is large to some extent.

Utilizing Maths. 1 and 2, this embodiment sets a direction and range in which a distance is changed between the focus position of the image pickup device 16 and the image pickup lens 62 (or the scanning direction and scanning range in the TVAF) in the TVAF after the SAF.

In the TVAF, the image pickup device 16 obtains image data. Next, the image processing circuit 18 addresses the contrast component of the object, calculates the image data from the image pickup device 16, and stores the evaluation value in the memory 22. Thereafter, the camera MPU 20 drives the focus lens of the image pickup lens 62 by a predetermined amount. Then, the image data is again obtained, and the image processing circuit 18 operates the image data and obtains the evaluation value. By repeating this procedure and by searching the peak position of the evaluation value, the focus position of the image pickup lens 62 is detected. Since the TVAF is well-known, a detailed description of the operational flow will be omitted.

FIG. 5 is a flowchart of autofocusing (or focus detection method) stored in the memory 22 and executed by the camera MPU 20, where "S" denotes an abbreviation of the step. The autofocusing illustrated in FIG. 5 is executed at the electronic viewfinder time in which the primary mirror 11 and the secondary mirror 12 are retreated to the outside of the image-pickup light flux, the opening of the shutter is released, and the image data obtained by the image pickup device 16 is sequentially displayed.

Initially, at the electronic viewfinder time, the camera MPU 20 detects turning on of the focus detection start command button or SW1 of the operational SW 24 (S102), and when determining that it is turned on, the camera MPU 20 instructs the SAF unit 40 to execute the SAF (S104, first step).

The SAF unit 40 generates a pair of focus detecting signals from the sequentially read image data, and calculates a phase difference between the pair of focus detecting signals utilizing the well-known correlation operation unit, and converts the phase difference into the defocus amount. The calculation of the defocus amount may be performed by the SAF unit 40 or the camera MPU 20. Since the SAF is performed in the electronic viewfinder in this embodiment, this embodiment discretely arranges the focus detecting pixels and realizes the thinning readout in the electronic viewfinder.

Next, the camera MPU 20 determines whether a defocus amount is equal to or smaller than the threshold stored in ht memory 22 (S106).

When the camera MPU 20 determines that the defocus amount is larger than the threshold (No of S106), the camera MPU 20 calculates a lens driving amount of the image pickup lens 62, and sends it to the lens MPU 70 for focusing of the focus lens (S108).

On the other hand, when determining that the defocus amount is equal to or smaller than the threshold (Yes of S106), the camera MPU 20 completes the SAF and obtains the focus detection correction value BP (correction information) of the phase difference AF unit 30 illustrated in Table 1 from the lens memory 72 or the memory 22 (S110).

In this case, the camera MPU 20 temporarily stores a variety of parameters, such as a zoom position, a focus position, and an F-number of the image pickup lens 62 in the memory 22 in the last focus detection in S104, and obtains the focus detection correction value BP suitable for these parameters.

Next, the camera MPU 20 sets the direction and range (scanning direction and scanning range) in which the focus position of the focus lens is changed in the TVAF, based on the focus detection correction value BP obtained in S110 (S112).

S110 and S112 constitute a method for controlling a focus detection executed by the camera MPU 20 (processor).

Figure 6:
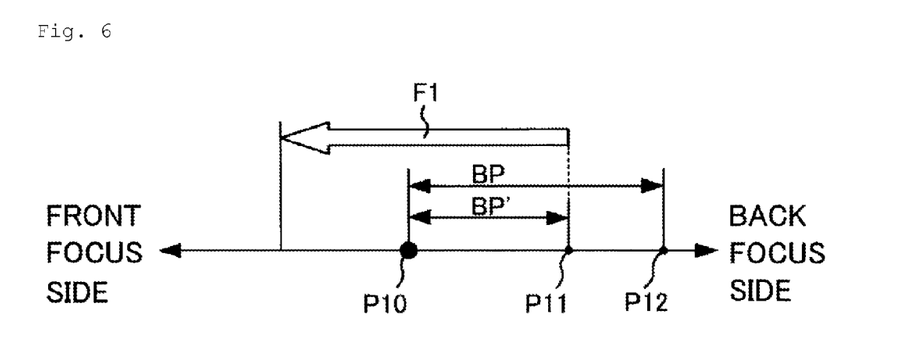
FIG. 6 is a conceptual diagram of S112 illustrated in FIG. 5.

FIG. 6 is a conceptual view of S112, and the left side represents that the image pickup lens 62 is focused on the front focus side, and the right side represents that the image pickup lens 62 is focused on the back focus side. P10 denotes a primary imaging plane position at which the image pickup device 16 is arranged, or an on-focus position (second focus position) to be detected by the TVAF (corresponding to the position M1 in FIG. 4). On the other hand, P11 denotes a (first) focus position (corresponding to the position M3 in FIG. 4) detected by the SAF unit 40 in S104 (first step). P12 corresponds to the position M2 illustrated in FIG. 4.

The focus detection correction value BP' of the SAF unit 40 cannot be recognized in the actual autofocusing, and thus the camera MPU 20 obtains the focus detection correction value BP of the phase difference AF unit 30 (S110) and estimates the focus detection correction value BP' based on the focus detection correction value BP. As illustrated in FIG. 4, BP and BP' shift in the same direction from the point P10, and BP' is smaller than BP.

The camera MPU 20 selects a direction illustrated in the arrow F1 to the scanning direction for the TVAF, and sets the range illustrated in an arrow F1 including the second focus position P10 to the scanning range (S112). It is sufficient for the range to include the position P10. The camera MPU 20 may calculate the range of the arrow F1 based on the focus detection correction value BP', or may utilize a prefixed value or a value that depends upon the focal length or the F-number of the image pickup lens 62 for the range of the arrow F1.

Since the image-plane position of the focus detecting light flux is located on the back focus side from the image-plane position of the image-pickup light flux as illustrated in FIG. 2, this embodiment sets the scanning direction to the front focus side from the first focus position as illustrated in FIG. 6. However, when the image-plane position of the focus detecting light flux is located on the front focus side from the image-plane position of the image-pickup light flux, the camera MPU 20 sets the scanning direction to the back focus side from the first focus position.

In general, when the image-plane position P12 of the focus detecting light flux LF2 is located on one of the front focus side and the back focus side from the image-plane position P10 of the image-pickup light flux LF1, the image-plane position P12 is located on the same side of the one of the front focus side and the back focus side from the image-plane position P11 of the focus detecting light flux LF4. In that case, the camera MPU 20 sets the scanning direction from the first focus position P11 to a direction that is opposite to the one of the front focus side and the back focus side. In addition, the camera MPU 20 sets the scanning range which is equal to or smaller than an absolute value of the focus detection correction value BP. Thereby, the TVAF unit 50 can scan the second focus position P10 from the first focus position P11 in the direction that is opposite to the one of the front focus side and the back focus side in the range of the focus detection correction value BP'.

Next, the camera MPU 20 instructs the TVAF unit 50 to execute the TVAF based on the scanning direction and the scanning range set in S112 (S114).

At last, the camera MPU 20 performs focusing of the image pickup lens 62 and terminates autofocusing based on the result of the TVAF (S116).

According to this embodiment, after the SAF unit 40 performs rough autofocusing onto a position near the on-focus position, the TVAF provides fine autofocusing. At that time, the scanning direction of the TVAF is restricted based on the focus detection correction value BP, and thus the focus can be highly precisely detected at a high speed.

Since the focus detection area of the phase difference AF unit 30 approximately correspond to that of the SAF unit 40 in this embodiment, the scanning direction of the focus position for the TVAF unit 50 can be set by applying the focus detection correction value BP to Math. 1.

However, when the focus detection area of the SAF unit 40 is wider than that of the phase difference AF unit 30, the camera MPU 20 calculates a representative image point X of the focus detection range of the SAF unit 40. Then, the camera MPU 20 sets the focus detection correction value BP of the phase difference AF unit 30 to focus detection correction values for the image point 0 at the center and the peripheral image point H of the image pickup screen, and calculates a focus detection correction value at a representative image point X based on the interpolation operation based on the focus detection correction value at the image point 0 and the focus detection correction value at the image point H. By utilizing this value, the scanning direction and the scanning range for the TVAF unit 50 can be set even when the focus detection area of the phase difference AF unit 30 does not accord with that of the SAF unit 40.

FIG. 7 is a flowchart of a variation of FIG. 5, and "S" denotes an abbreviation of the step. Those steps in FIG. 7, which are corresponding steps in FIG. 5, will be designated by the same reference numerals, and a description thereof will be omitted. The autofocusing illustrated in FIG. 7 is also executed at the electronic viewfinder time, at which the primary mirror 11 and the secondary mirror 12 are retreated to the outside of the image-pickup light flux, the opening of the shutter is released, and the image data obtained by the image pickup device 16 is sequentially displayed.

After S110, the camera MPU 20 determines whether the focus detection correction value BP obtained by S110 is equal to or smaller than the (first) threshold stored in the memory 22 (S120).

When the camera MPU 20 determines that the focus detection correction value BP is equal to or smaller than the threshold (Yes of S120), the camera MPU 20 sets the scanning direction of the focus position of the image pickup lens 62 to both directions of the front focus side and the back focus side from the position P11 and the scanning range to a narrow range (S122).

Figure 8A:
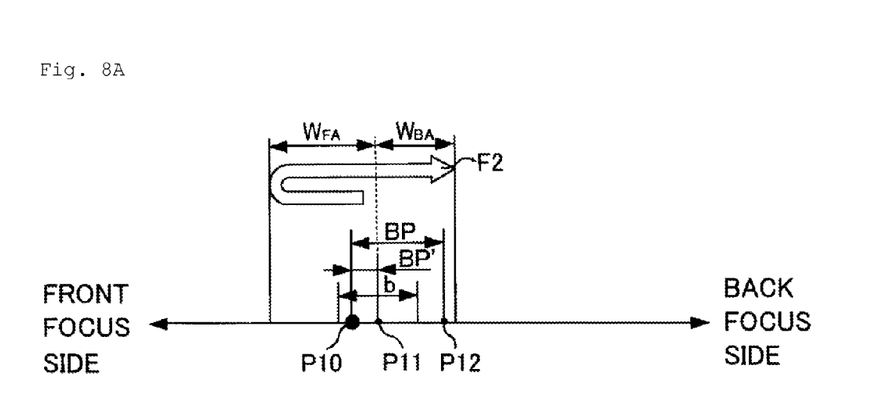
FIG. 8A is a conceptual diagram of S122, S126, and S128 illustrated in FIG. 7.

FIG. 8A is a conceptual diagram of S122. A value of the focus detection correction value BP' of the SAF unit 40 is not recognized in the actual autofocusing, similar to FIG. 6. Therefore, the camera MPU 110 estimates BP' from the focus detection correction value BP detected by the phase difference AF unit 30 but when the focus detection correction value BP is small to some extent as illustrated in FIG. 8A, BP' becomes smaller from Maths. 1 and 2 and P11 approaches to the point P10.

Now, where b denotes a scattering range of the focus detection determined by the stopping accuracy of the focus lens in the image pickup lens 62, the first focus position P11 by the SAF unit 40 may be located on the front focus side from the second focus position P10 depending upon the scattering range b.

Accordingly, as illustrated by an arrow F2, the camera MPU 20 sets the scanning direction for the TVAF to both directions of the front focus side and the back focus side from the point P11, and the scanning range to a scanning range $W_{FA}$ on the front focus side and a scanning range $W_{FB}$ on the back focus side (S122).

Here, the scanning range $W_{FA}$ on the front focus side and the scanning range $W_{FB}$ on the back focus side need to satisfy the following equations:

$$W_{FA} > BP' + \frac{b}{2} \qquad \text{[Math. 3]}$$

$$W_{BA} > \left|\frac{b}{2} - BP'\right| \qquad \text{[Math. 4]}$$

When Maths. 3 and 4 are satisfied, the TVAF can detect the focus position P10 even when the first focus position P11 detected by the SAF unit 40 scatters in the scattering range b.

FIG. 8A illustrates that the image-plane position P11 or P12 of the focus detecting light flux is located on the back focus side from the image-plane position P10 of the image-pickup light flux LF1, as illustrated in FIG. 2, or the image-plane position P12 is located on the back focus side from the image-plane position P11.

In general, when the image-plane position P12 of the focus detecting light flux LF2 is located on one of the front focus side and the back focus side from the image-plane position P10 of the image-pickup light flux LF1, the image-plane position P12 is located on the same side of the one of the front focus side and the back focus side from the image-plane position P11. In S122, the camera MPU 20 sets the scanning direction to both directions of the front focus side and the back focus side from the first focus position P11 when the image plane position P12 of the focus detecting light flux LF2 is located on one of the front focus side and the back focus side from the image-plane position P11 of the image-pickup light flux LF4. In addition, in S122, when the image plane position P12 of the focus detecting light flux LF2 is located on one of the front focus side and the back focus side from the image plane position P11 of the image-pickup light flux LF4, the camera MPU 20 sets the scanning direction to both directions or the front focus side and the back focus side from the first focus position P11. In addition, the camera MPU 20 sets, in accordance with Math. 3, the scanning range on a side opposite to the one of the front focus side and the back focus side from the first focus position P11 to be larger than a sum of the focus detection correction value BP' and half a scattering range b of the focus detection of the SAF unit 40. In addition, the camera MPU 20 sets, in accordance with Math. 4, the scanning range on the front focus side or the back focus side from the first focus position P11 to be larger than an absolute value of a subtraction between the focus detection correction value BP' from half a scattering range b.

In this case, when the position P12 is located on the front focus side from the first focus position P11 or the second focus position P10, the scanning range on the front focus side corresponds to Math. 4 and the scanning range on the back focus side corresponds to Math. 3. In addition, the actual scanning range may be made by multiplying a value on the right side of Math. 3 or 4 by a safety ratio so that the point P10 can be surely included in that range.

On the other hand, when determining that the focus detection correction value BP is larger than the threshold (No of S120), the camera MPU 20 determines whether the focus detection scattering value determined by the stopping accuracy of the image pickup lens 62 is equal to or smaller than the (second) threshold stored in the memory 22 (S124). The focus detection scattering of the image pickup lens 62 is previously stored in the lens memory 72, and the camera MPU 20 can obtain it via the lens MPU 70.

When determining that the focus detection scattering is equal to or smaller than the threshold (Yes of S124), the camera MPU 20 sets the scanning direction and the scanning range based on the focus detection correction value BP obtained in S110 (S126).

Figure 8B:
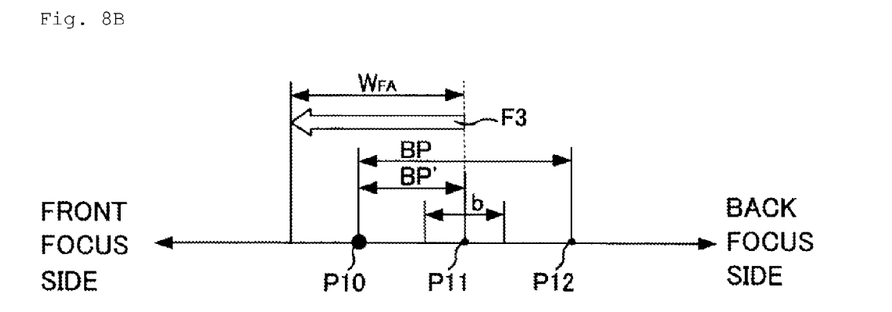
FIG. 8B is a conceptual diagram of S122, S126, and S128 illustrated in FIG. 7.

FIG. 8B is a conceptual view of S126. The focus detection correction value BP' cannot be recognized in the actual focusing similar to FIG. 6, and is estimated to be larger as the focus detection correction value BP becomes larger. In addition, the scattering range b of the focus detection is sufficiently small for the focus detection correction value BP'.

Accordingly, as illustrated by an arrow F3, the camera MPU 20 sets the scanning direction of the TVAF to a single direction on the front focus side of the point P11, and sets the scanning range in accordance with Math. 3 (S126). Thereby, irrespective of the focus detection scattering, the focus position can be detected by the TVAF.

FIG. 8B also illustrates that the image-plane position P11 or P12 of the focus detecting light flux is located on the back focus side from the image-plane position P10 of the focus detecting light flux or the image-plane position P12 is located on the back focus side from the image-plane position P11.

In general, when the image-plane position P12 of the focus detecting light flux LF2 is located on one of the front focus side and the back focus side from the image-plane position P10 of the image-pickup light flux LF1, the image-plane position P12 is located on the same side as the one of the front focus side and the back focus side from the image-plane position P11. In S126, the camera MPU 20 sets the scanning direction to a direction opposite to the one of the front focus side and the back focus side from the first focus position P11. In addition, the camera MPU 20 sets the scanning range in accordance with Math. 3 so that the scanning range can be larger than a sum of the focus detection correction value BP' and half a focus detection scattering range b of the SAF unit 40.

Math. 3 is also applied when the position P12 is located on the front focus side of the second focus position P10. In addition, the actual scanning range may be made by multiplying a value on the right side of Math. 3 by a safety ratio so that the point P10 can be surely included in that range.

On the other hand, when determining that the focus detection scattering value is larger than the threshold (No of S124), the camera MPU 20 sets the scanning direction of the focus position of the image pickup lens 62 to both directions or the front focus side and the back focus side of the position P11, and sets that scanning range to the wide range.

Figure 8C:
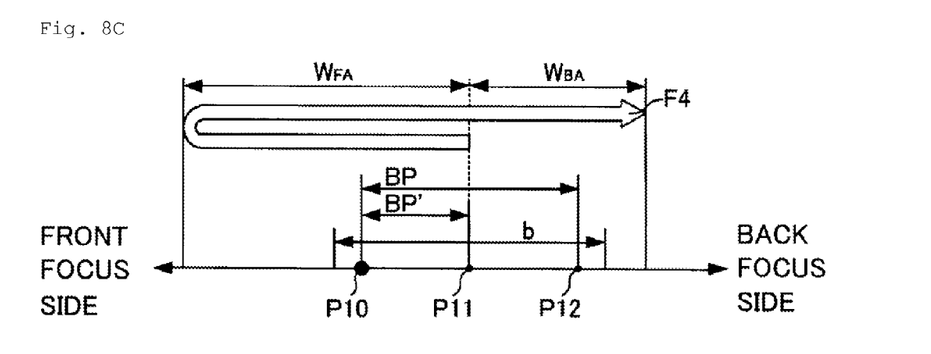
FIG. 8C is a conceptual diagram of S122, S126, and S128 illustrated in FIG. 7.

FIG. 8C is a conceptual view of S128, and definitions of the points P10 to P12 are similar to those in FIG. 6. The focus detection correction value BP' cannot be recognized in the actual autofocusing similar to FIG. 6, and is estimated to be larger as the focus detection correction value BP becomes larger. In addition, the scattering range b of the focus detection is large and thus the focus detection position P11 detected by the SAF unit 40 may be located on the front focus side of the primary imaging plane position P10 depending upon the scattering range b.

Accordingly, as illustrated by an arrow F4, the camera MPU 20 sets the scanning direction for the TVAF to both directions or the front focus side and the back focus side from the point P11, and sets the scanning range to the scanning range WFA on the front focus side and the scanning range WFB on the back focus side (S128). The scanning range WFA on the front focus side and the scanning range WFB on the back focus side need to satisfy Maths. 3 and 4.

FIG. 8C also illustrates that the image-plane position P11 or P12 of the focus detecting light flux is located on the back focus side of the image-plane position P10 of the image-pickup light flux or the image-plane position P12 is located on the back focus side of the image-plane position P11, and its generalization condition is similar to that of S122.

After S122, S126 or S128, S114 and S116 are performed.

As described above, since the control of the TVAF is switched based on the focus detection correction value BP of the phase difference AF unit 30, the probability of the focusing failure decreases, and a high-speed focus detection is available.

Each flowchart illustrated in FIG. 5 or FIG. 7 can be implemented as a program executable by a processor.

The camera is applicable to photography of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

16 IMAGE PICKUP DEVICE
20 CAMERA MPU (ACQUISITION UNIT, PROCESSOR)
22 MEMORY
30 PHASE DIFFERENCE AF UNIT (FIRST FOCUS DETECTION UNIT)
40 SAF UNIT (SECOND FOCUS DETECTION UNIT)
50 TVAF UNIT (THIRD FOCUS DETECTION UNIT)
62 IMAGE PICKUP LENS
64 STOP
70 LENS MPU
72 LENS MEMORY

The invention claimed is:

1. A camera in which a lens unit is detachable, the lens unit including an image pickup lens configured to form an object image, the lens unit compatible with a first focus detection unit configured to provide a focus detection by detecting a phase difference between a pair of object images formed by utilizing a first pupil splitting unit, the camera comprising:
a second focus detection unit configured to provide a focus detection by detecting a phase difference between a pair of object images formed by utilizing a second pupil splitting unit different from the first pupil splitting unit;
a third focus detection unit configured to provide a focus detection by detecting a peak position of a contrast of the object image by performing scanning that changes a distance between an image pickup device and a focus position formed by the image pickup lens; and
an acquisition unit configured to acquire correction information used to correct a shift amount between a focus detecting light flux and an image-pickup light flux from the image pickup lens,
wherein the third focus detection unit performs the scanning in a single direction from a focus position detected by the second focus detection unit, the single direction being set based on the correction information.

2. The camera according to claim 1, wherein the correction information is larger than a first threshold and a scattering range of the focus detection provided by the second focus detection unit is smaller than a second threshold.

3. The camera according to claim 1, wherein the correction information is stored in the lens unit, and the acquisition unit acquires the correction information from the lens unit.

4. A focus detection method used for a camera to which a lens unit is detachable, the lens unit including an image pickup lens configured to form an object image, the lens unit compatible with a first focus detection unit configured to provide a focus detection by detecting a phase difference between a pair of object images formed by utilizing a first pupil splitting unit, the A focus detection method comprising:
a first step of providing a focus detection by detecting a phase difference between a pair of object images formed by utilizing a second pupil splitting unit different from the first pupil splitting unit;
a second step of providing a focus detection by detecting a peak position of a contrast of the object image by performing scanning that changes a distance between an image pickup device and a focus position formed by the image pickup lens; and
a step of acquiring correction information used to correct a shift amount between a focus detecting light flux and an image-pickup light flux from the image pickup lens,
wherein the scanning is performed in a single direction from a focus position detected by the first step, the single direction being set based on the correction information.

5. A control method executed by a processor, of a focus detection in a camera to which a lens unit is detachable, the lens unit including an image pickup lens configured to form an object image, the lens unit compatible with a first focus detection unit configured to provide a focus detection by detecting a phase difference between a pair of object images formed by utilizing a first pupil splitting unit, the camera including a second focus detection unit configured to provide a focus detection by detecting a phase difference between a pair of object images formed by utilizing a second pupil splitting unit different from the first pupil splitting unit and a third focus detection unit configured to provide a focus detection by detecting a peak position of a contrast of the object image by performing scanning that changes a distance between an image pickup device and a focus position formed by the image pickup lens, the control method comprising:

acquiring through the processor correction information used to correct a shift amount between a focus detecting light flux and an image-pickup light flux from the image pickup lens,     setting a scanning direction for the third focus detection unit to a single direction from a focus position detected by the second focus detection unit, based on the correction information.

* * * * *